Feb. 28, 1956 W. E. KOCK 2,736,894
DIRECTIVE ANTENNA SYSTEMS
Filed Jan. 22, 1946 8 Sheets-Sheet 1

FIG. 3
UNIT LENS

INVENTOR
W. E. KOCK
BY
A. J. Zerbarini
ATTORNEY

Feb. 28, 1956     W. E. KOCK     2,736,894
DIRECTIVE ANTENNA SYSTEMS Filed Jan. 22, 1946     8 Sheets-Sheet 2

FIG. 8
PLANO-ELLIPSOIDAL LENS

FIG. 17
BANDWIDTH CHARACTERISTICS

INVENTOR
W. E. KOCK
BY
A. J. Zerbarini
ATTORNEY

Feb. 28, 1956  W. E. KOCK  2,736,894
DIRECTIVE ANTENNA SYSTEMS
Filed Jan. 22, 1946  8 Sheets-Sheet 4

INVENTOR
W. E. KOCK
BY A. J. Zerbarini
ATTORNEY

Feb. 28, 1956  W. E. KOCK  2,736,894
DIRECTIVE ANTENNA SYSTEMS
Filed Jan. 22, 1946  8 Sheets-Sheet 6

FIG. 18
E-PLANE ON-FREQUENCY DIRECTIVE PATTERN FOR LENS 65 WITH POINT PRIMARY ANTENNA

FIG. 19
H-PLANE ON-FREQUENCY DIRECTIVE PATTERN FOR LENS 65 WITH POINT PRIMARY ANTENNA

INVENTOR
W. E. KOCK
BY
*A. J. Zerbarini*
ATTORNEY

Feb. 28, 1956  W. E. KOCK  2,736,894
DIRECTIVE ANTENNA SYSTEMS
Filed Jan. 22, 1946  8 Sheets-Sheet 7

INVENTOR
W. E. KOCK
BY
A. J. Zerbarini
ATTORNEY

United States Patent Office 2,736,894
Patented Feb. 28, 1956

2,736,894

DIRECTIVE ANTENNA SYSTEMS

Winston E. Kock, Middletown, N. J., assignor to Bell Telephone Laboratories, Incorporated, New York, N. Y., a corporation of New York Application January 22, 1946, Serial No. 642,723

18 Claims. (Cl. 343—753)

This invention relates to systems for directively propagating space waves and particularly to passive refractors of the focusing type and to directive radio antenna systems comprising lenses.

As is known, passive or secondary antenna members of the reflective, diffractive, and refractive types have heretofore been utilized in directive antenna systems with active or primary antenna members, for the purpose of securing unidirectional or unilateral radio action, high directivity gain, directive characteristics or patterns with relatively small minor lobes, and related directional effects. Thus, parabolic reflectors of the continuous or sheet metal type or of the metallic grid type, diffractors of the dielectric zone plate type comprising a solid dielectric medium, and dielectric lenses comprising a homogeneous solid dielectric medium, for example, polystyrene, have been employed in directive antenna systems. To illustrate, Fig. 21 of Patent 2,283,935, granted to A. P. King, shows a horn antenna having a solid dielectric lens in its mouth aperture.

While, in general, the above-mentioned prior art passive devices have been employed with success, the results secured have not always been entirely satisfactory. In particular, in the case of the parabolic reflector, the directive pattern is often impaired by the "shadow effect" of the primary antenna or so-called "feed" which, of necessity, is positioned in front of the reflector. Moreover, slight accidental tilting or displacement of the concave reflector, or so-called "dish," materially changes the direction of maximum action of the antenna system. Also, assuming the paraboloidal reflector is employed in a scanning radar system of the movable feed or movable dish type, the primary antenna member and the focus of the reflector may be moved away, or displaced from, each other along the latus rectum of the reflector only a relatively small amount, without introducing highly undesired coma aberration. As is known, this type of aberration produces a detrimental coma minor lobe in the directive pattern taken in the scanning plane. Considering the prior art lenses mentioned above, although the bandwidth of a lens is not as large as that of a concave reflector, the lens possesses distinct advantages over the reflective type. More specifically, a lens may be tilted considerably without affecting the directivity and, in scanning systems, the primary antenna may be displaced from the real focus of the lens a relatively large distance without causing coma aberration. The solid dielectric lenses, and also the solid dielectric diffractors, of the prior art have, however, certain intrinsic defects. To illustrate, the attenuation of the waves passing through the solid dielectric and the per cent or amount of reflection at the two surfaces of the dielectric medium are usually fairly high, with the result that the total energy loss, including reflective losses, is considerable. In addition, the prior art solid lenses are relatively expensive, easily broken or impaired and ordinarily difficult to manufacture, especially in quantities. Accordingly it now appears desirable to secure a passive antenna structure which is devoid of the disadvantages inherent in the prior art passive devices, and to obtain, in particular, refractors of the focusing type which are inexpensive, easily constructed and manufactured and substantially lossless.

It is one object of this invention to focus radio waves in a more efficient and satisfactory manner than heretofore accomplished.

It is another object of this invention to focus waves without incurring energy losses.

It is another object of this invention to convert a circular or spherical wave front to a linear or plane wave, respectively, or vice versa, without appreciably attenuating the waves or producing substantial reflective losses in the propagated energy.

It is another object of this invention to obtain, in a radio lens antenna, a large bandwidth.

It is another object of this invention to reduce considerably the thickness or depth of a multiple-zone lens.

It is another object of this invention to minimize in a stepped multiple-zone lens, diffractive and shadow effects at the junctions of the zones.

It is another object of this invention to reduce, in a system comprising a primary antenna member and a secondary refractive antenna member, the intensity of the waves reflected and returned by the secondary member to the primary member.

It is another object of this invention to avoid utilizing conventional solid dielectric material in a focusing refractor.

It is another object of this invention, in an antenna system comprising a passive antenna focusing member and an active antenna member, to eliminate shadow effects of the active member, minimize coma aberration, and maintain or preserve the directive action despite small rotation or displacement of the focusing member.

It is still another object of this invention to eliminate cross-talk and other interaction effects in a repeater antenna system comprising a pair of back-to-back oppositely directed receive-transmit antennas.

As used herein the terms "wave guide," "dielectric guide," and "dielectric channel" have the same denotations as in my copending companion application, Serial No. 642,722, filed January 22, 1946. Thus, the term "wave guide" generically denotes (1) a conductive line or path such as a single or a two-wire line, or a conventional coaxial line and (2) a dielectric line such as a metallic tube filled with a gaseous, liquid or solid dielectric substance or a bare dielectric rod. The term "dielectric guide" specifically signifies a dielectric line in which the dielectric medium is completely surrounded or bounded by a conductive member or members, whereas the term dielectric channel denotes a dielectric line in which the dielectric medium is bounded by conductive members on only two opposite sides. Also, as used herein, the term "front surface" or "front face" denotes the lens surface facing away from the primary antenna and the term "back surface" or "back face" refers to the surface facing the primary antenna. The term "focus" is generic to focal point or point focus and to focal line or line focus.

In accordance with one of several preferred and successfully tested embodiments of the invention, the lens antenna member is heterogeneous and comprises a plurality of parallel rectangular dielectric channels substantially the same, except for channel depth, as those disclosed in my copending companion application mentioned above. The channels are positioned along a horizontal line perpendicular to the desired direction of maximum radio action. Each channel is open at the top and bottom and comprises the inner surfaces of a pair of vertical metallic plates or side walls and the air dielectric included therebetween, the plates being parallel to the vertical electric polarization of the propagated wave and spaced horizontally at least a half wavelength apart. Since the dielectric medium is air, the phase velocity in each channel is greater than the phase velocity in free space, so that the refractive index, referred to air, is smaller than unity. At points on the back face of the lens, and spaced from the lens focus a wavelength, or a multiple thereof, greater than the focal length of the unit the channels are stepped forward, approximately a wavelength, in all planes containing the lens axis so as to form a stepped multiple-zone unit lens. Considering any zone as, for example, the first or central zone, the thickness or depth of each channel, corresponding to the transverse dimension of each plate, varies in the vertical plane from a minimum at the center, that is, at the lens axis, to a maximum at the top and bottom extremities. More specifically, the channel thickness or depth varies in a predetermined manner and such that each channel constitutes a positive concave unit lens for focusing the waves in the vertical plane. In all other planes containing the lens axis as, for example, the horizontal plane, the depth of the parallel channels varies from a minimum at the central channel to a maximum at the end channels, and in the predetermined manner described above, so that the lens is circularly or spherically symmetrical and equal omniplanar focusing obtains. In more detail, the front face of the lens is flat and the variation in depth in each zone and in any axial plane is elliptical so that the back face is concave and ellipsoidal and the plates have different transverse dimensions and therefore different shapes. Stated differently, the positive or convergent lens is plano-concave and, more specifically, plano-ellipsoidally concave. Each face of the "circular" lens has a square periphery. The lens is mounted in the mouth aperture of a pyramidal horn, the throat aperture of which is at the focal point of the circularly symmetrical lens and in a sense constitutes a point type primary antenna.

In operation, the phases of the wave components or wavelets propagated through the outer portions of lens are advanced or accelerated more rapidly, by reason of the increase in phase velocity and the longer paths in the lens traversed by these components, than the phases of the wavelets propagated through the inner portion of the lens. Considered differently, the wavelets in the outer lens portion are refracted toward the axis to a greater degree than the wavelets passing through the inner portion of the lens. As a result, an outgoing expanding or diverging spherical wave front and an incoming plane wave front are converted to a plane front and a contracting or converging spherical wave front, respectively, and maximum unidirective radio action is obtained. The bandwidth of the stepped multiple zone lens is approximately inversely proportional to the number of zones; and as compared to a comparable unstepped multiple-zone lens, the bandwidth of the stepped lens described above is fairly large. Preferably a value of refractive index in the order of 0.5 to 0.7, as 0.6, for example, is employed for the purpose of minimizing reflection at the faces of the lens. The axial length of the pyramidal horn, equipped with the positive concave metallic plate lens described above, is approximately ten feet for a design wavelength of 7 centimeters and is about one-twentieth of the axial length, 200 feet, of a comparable optimum-angle conventional horn.

In accordance with another embodiment the plates of a positive concave stepped lens have the same plano-elliptical shape, so that the lens is cylindrically symmetrical and has a line focus, whereby only uniplanar focusing as, for example, focusing only in the vertical plane, is produced by the lens. The "cylindrical" lens has a rectangular, but not usually square, periphery and a line type primary antenna, such as a so-called sectoral horn, is aligned with the lens focal line for securing unidirective action in the horizontal plane.

In still another embodiment, a cylindrical lens is symmetrically biconcave in configuration and the two positive focal lengths, corresponding to the two real or conjugate foci, one on each side of the lens, are equal, the focusing actions on the two sides of the lens being identical.

In another embodiment, a cylindrical lens is tilted about its mid-point for the purpose of minimizing the intensity of the energy reflected by both faces of the lens and undesirably received by the primary antenna and associated line or guide.

In another embodiment, the primary antenna is displaced from the lens focus a relatively large distance without introducing appreciable coma aberration.

In another embodiment, two pyramidal receiving-transmitting horns are employed at a repeater station and positioned back-to-back, for the purpose of preventing or minimizing cross-talk between the adjacent, or outgoing and incoming, radio links.

The invention will be more fully understood from a perusal of the following specification taken in conjunction with the drawing on which like reference characters denote elements of similar function and on which.

Figures 1, 2, 3, 4, 7:
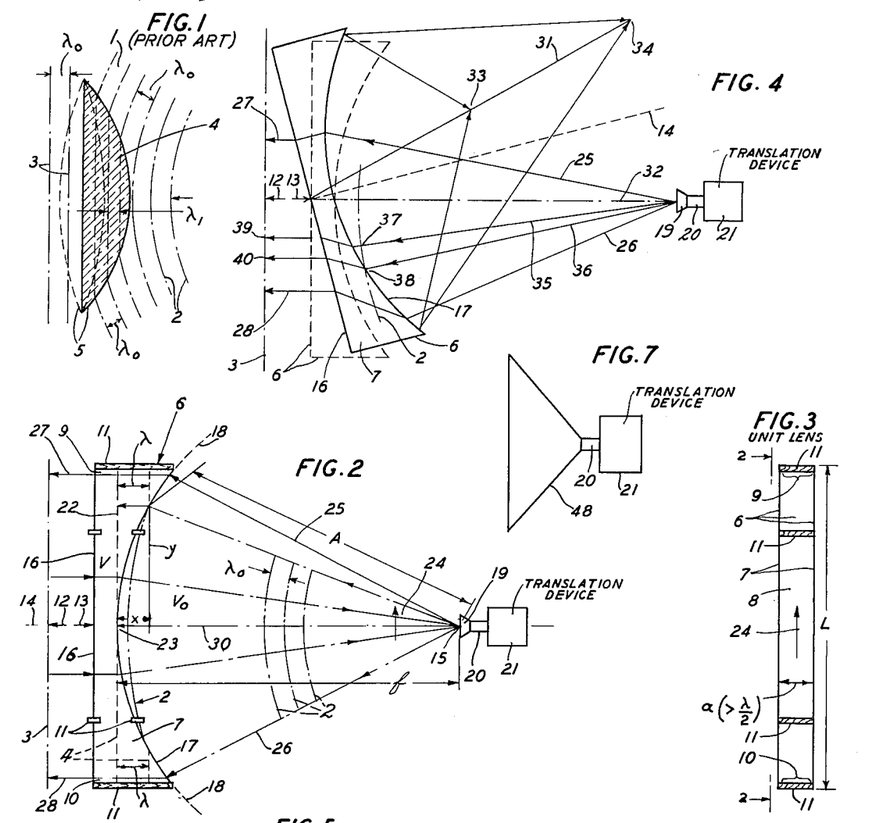
Fig. 1 is a sectional view of a conventional prior art positive convex optical or radio lens composed of homogeneous solid dielectric material, the lens being included herein for the purpose of explaining the invention.
Figs. 2 and 3 are, respectively, side and front views of a simple embodiment of the invention comprising a single channel or plano-concave unit lens.
Fig. 4 is a side view of the unit lens of Figs. 2 and 3 titled in accordance with the invention.
Fig. 7 is a plan view of the line type primary antenna associated with the lens of Figs. 5 and 6.

Referring to Fig. 1, reference numeral 1 denotes a glass or polystyrene plano-convex prior art optical or radio lens which, as is well known, is a positive or converging lens having a real focus. Also, as well understood in physical optics, the convex lens functions to delay certain components or rays of a propagated beam more than other rays. The retardation is such that the parallel rays of a beam incoming to the flat side of the lens are refracted and focussed at a point; and the diverging rays of a beam originating at a point and impinging upon the convex side are refracted different amounts so as to form a beam or bundle of parallel rays. In more detail, and as considered in geometrical optics, the lens 1 functions to convert a circular or spherical wave front, represented by the arcuate lines 2, into a linear or plane front represented by the lines 3, or vice versa. The adjacent lines 2 and the adjacent lines 3, illustrate corresponding points, for example, positive nodal points spaced a wavelength apart, as measured in free space, on the incoming spherical wave and on the outgoing plane wave, respectively; and the lines 4 represent corresponding points on the wave passing through the lens. The index, $n_1$, of refraction of the lens 1 is greater than unity, and its phase velocity characteristic, $v_1$, is smaller than the phase velocity characteristic, $v_0$, of free space, or stated mathematically $$n_1 = \frac{v_0}{v_1} > 1 \quad (1)$$

Accordingly, the wavelength, $\lambda$, as measured in the lens 1 is less than the wavelength, $\lambda_0$, as measured in free space and, in passing through the lens 1, the wave is retarded. The total phase delay in the components passing through the outer thin portions of the lens is less than the total phase delay of the waves passing through the inner, including the axial, portion and such that a spherical wave front originating at the lens focus and impinging upon the convex surface of the lens is converted to a plane wave front, and a plane wave front arriving at, and propagated perpendicularly to, the flat surface is converted to a spherical wave. Also, as well known, instead of plano-convex, the prior art lens may be symmetrically biconvex, as illustrated by the dash-dash line 5.

Referring to Figs. 2 and 3, reference numeral 6 denotes a dielectric channel or unit lens comprising a pair of vertical metallic plates and the air dielectric medium 8 included therebetween, the plates being spaced apart a horizontal distance $a$ greater than one-half of the longest wavelength, $\lambda_2$, in the operating band. The plates extend longitudinally in planes parallel to the wave electric polarization, which is assumed to be vertical, and dimension $a$ is perpendicular to the aforesaid polarization. Obviously, the polarization may be other than vertical as, for example, horizontal. The top and bottom sides 9, 10 of the channel 6 are electrically open, the plates being held in position by the wooden members 11. The width or transverse dimension of the plates, corresponding to the channel depth and lens thickness $d$, is parallel to the propagation direction of an incoming wave or the desired direction 13 of an outgoing wave. Numerals 14 and 15 denote, respectively, the axis and the focus, and numerals 16 and 17 designate, respectively, the front and back faces, of the unit lens 6. As explained hereinafter, the front face 16 is flat and the back face 17 is concave, the profile or curvature 18 of the back face being elliptical. The unstepped lens 6 may have one or more zones dependent upon the wavelength, focal length, and the so-called $f$-number, that is, the ratio of the focal length $f$ to the aperture or width L of the lens. An $f$-number of as low as 0.5 is obtainable with the lens of the invention, whereas in optics the lowest $f$-number generally obtainable is 1.5. Reference numeral 19 denotes a point-type primary antenna member as, for example, a conical horn antenna, positioned at the focus 15 and connected by the dielectric guide 20 to a translation device 21, such as a transmitter or receiver.

Inasmuch as the dielectric medium is air, with a dielectric constant of unity, the phase velocity, $v$, and the wavelength, $\lambda$, in the channel are greater, respectively, than the free space phase velocity $v_0$, and the free space wavelength $\lambda_0$; and the refractive index, $n$, is smaller than unity, that is, $$n = \frac{v_0}{v} < 1 \quad (2)$$

Now, in the two-sided air dielectric channel, as in a conventional four-sided air dielectric guide, $$\frac{v_0}{v} = \sqrt{1 - \left(\frac{\lambda_0}{2a}\right)^2} = n \quad (3)$$

so that the refractive index $n$ is a function of $a$. Since $n$ is less than unity, the lens 6 is in a sense the converse of the prior art solid lens 1 of Fig. 1 and a concave metal plate lens such as the lens 6 will cause parallel rays to converge, and a convex metal plate lens will cause the rays to diverge. It will be noted that the spacing, Fig. 2, between the corresponding points of the waves 4 in the channel is greater than the spacing between the wave fronts 2 or 3, whereas as indicated above the spacing between the fronts 4, Fig. 1, is smaller than the spacing between the fronts 2 or 3.

Considering the profile 18 of the back lens face 17, the phases of the rays or wavelets originating at the lens focus 15 and passing through the lens 6, Fig. 2, should be equal upon arriving at a plane parallel to the front face 16. That is, $$\sqrt{\frac{(f-x)^2 + y^2}{v_0}} + \frac{x}{v} = \frac{f}{v_0} \quad (4)$$

where $f$ is the focal length, and $x$ and $y$ are the distances shown in Fig. 2, or, $$(1-n^2)x^2 - 2(1-n)fx + y^2 = 0 \quad (5)$$

when $n$ has the value given in Equation 2. Equation 5 is the equation of an ellipse having a radius of curvature $\rho$, at $y$ equal to zero, $$\rho = f(1-n) \quad (6)$$

the origin $$x = 0 \quad (7)$$

and $$y = 0 \quad (8)$$

being taken at the vertex 23 of the ellipse. It may be observed here that the lens focus 15, that is, the radio or optical focus, is displaced from both mathematical foci of the ellipse of Equation 5, whereas in a parabolic reflector the reflector focus and the mathematical focus of the parabola are superimposed. The latus rectums of the ellipse of Equation 5 are, of course, parallel to the back face 17 of the lens 6.

Equation 5 may readily be reduced to the conventional equation $$\frac{(x_1)^2}{a_1^2}+\frac{y^2}{b_1^2}=1 \quad (9)$$

for an ellipse, where the origin $$x_1=0 \quad (10)$$

and $$y=0 \quad (11)$$

is at the center of the ellipse, and $a_1$ and $b_1$ are constants. Thus, in Equation 5 letting the term $$(1-n)^2=c \quad (12)$$

and the term $$2(1-n)f=d \quad (13)$$

we obtain $$cx^2-dx+y^2=0 \quad (14)$$

or $$x^2-\frac{d}{c}x+\frac{y^2}{c}=0 \quad (15)$$

adding $$\frac{d^2}{4c^2} \quad (16)$$

to both sides of equation 15, we get $$x^2-\frac{d}{c}x+\frac{d^2}{4c^2}+\frac{y^2}{c}=\frac{d^2}{4c^2} \quad (17)$$

and reducing, we have $$\left(x-\frac{d}{2c}\right)^2+\frac{y^2}{c}=\frac{d^2}{4c^2} \quad (18)$$

Letting the distance along the $x$ axis between the two origins equal $$x-x_1=\frac{d}{2c} \quad (19)$$

or $$x_1=x-\frac{d}{2c} \quad (20)$$

we have $$x_1^2+\frac{y^2}{c}=\frac{d^2}{4c^2} \quad (21)$$

or $$\frac{x_1^2}{\frac{d^2}{4c^2}}+\frac{y^2}{\frac{d^2}{4c}}=1 \quad (22)$$

Let $$\sqrt{\frac{d^2}{4c^2}}=a \quad (23)$$

and $$\sqrt{\frac{d^2}{4c}}=b \quad (24)$$

we have $$\frac{x_1^2}{a_1^2}+\frac{y^2}{b_1^2}=1 \quad (25)$$

which has the form of Equation 9. In this connection it may be observed that while preferably the front face 16 is plane and the back face 17 is elliptical, these faces may each have any other contour or curvature, provided the thickness $t$ is properly proportioned.

In operation, assuming device 21 is a transmitter, waves are supplied by the transmitter 21 over dielectric guide 20 to the conical horn 19 and waves having a vertical electric polarization, represented by arrows 24, are projected toward the concave face 17 of the unit lens 6. In the vertical plane of axis 14, the wave front 2 radiated by horn 19 is circular. The diverse rays as, for example, outer rays 25 and 26, diverge and, upon entering and passing through the lens 6, are bent so as to be parallel to axis 14, as shown by arrows 27 and 28, whereby an outgoing wave 12 having a plane wave front 3 is established. The reference ray 30, traveling along the lens axis 14 and in a direction perpendicular to the segmental face portion at vertex 23, is not refracted in the lens 6. More specifically, each of the diverging rays, as ray 25, is accelerated in phase relative to the phase of the reference ray, by reason of the increase, $v-v_0$, in phase velocity and by virtue of the difference in the thicknesses $t$ or path lengths traversed by the ray and the reference ray 30, and arrives at plane 22 in phase with the reference wave. Since the lens is plano-elliptical, the path lengths or thicknesses $t$ traversed by the rays vary in a manner such that the phases of the diverse outer rays are advanced different amounts and arrive in phase at plane 22, whereby maximum unidirective action along direction 12 is secured. In reception, assuming device 21 is a receiver, the reciprocal operation is obtained. Thus, assuming an incoming plane wave having a direction 13 perpendicular to the flat front face 16 impinges upon this face, the wavelets pass through the lens without refraction but, upon emerging from the lens at the back face 17, are bent and focussed on the point type primary antenna 19 at the focal point 15.

Again assuming device 21 is a transmitter, in order to minimize feedback into the horn 19 of energy radiated by horn 19 and reflected in part by the front and back faces 16, 17 of the unit lens 6, the lens may be tilted as shown in Fig. 4. The reflection referred to here is caused primarily by the change in phase velocity introduced in the waves at the surface of the lens when the wave passes from a medium having one phase velocity characteristic to another medium having a different phase velocity characteristic, the reflection caused by the thin edges of the metallic plates being negligible. In Fig. 4, the lens is rotated about its vertex 23 so that its axis 14 assumes the position shown. The focal points for waves reflected in part by the two faces of the lens are along the line 31 which forms an angle with the axis 14 equal to the angle between the axis 14 and the original position 32 of the lens axis or, stated differently, the angles of incidence and reflection are equal. The back face 17 functions as a concave partial reflector and the waves reflected thereby are focused at point 33; and the front face 16 acts as a plane reflector and the wavelets reaching this surface through the lens, and redirected back through the lens, are focused at point 34. If the lens were not tilted, the waves reflected by front face 17 would, of course, be focused on the horn 19 at the lens focus 15. Hence, by reason of the tilting feature, the intensity of the feedback to the horn 19 and guide 20 is minimized, whereby standing waves in guide 20 are reduced and, in a sense, the lense 6 is substantially matched to the horn 19. At the same time, tilting the lens does not materially affect the directive action of the system. Thus the outgoing diverging rays 25, 26 are refracted in the lens toward the thinner portion of the lens and, upon emerging from the front face 16 are propagated in directions parallel to the original axis portion 32 and direction 12, and perpendicular to wave front 4. More particularly, considering rays 35 and 36 which are in phase at points 37, 38 on the circular wave front 2, ray 35 in traveling from point 37 to point 39 and ray 36 in traveling from point 38 to point 40 should arrive approximately in phase. In practice, it has been found that a particular lens may be tilted or rotated as much as 33 degrees without detrimental effects. As disclosed and claimed in my above-mentioned companion application reflection from the lens surface may be rendered negligible by using a refractive index in the order of 0.6.

Figure 5:
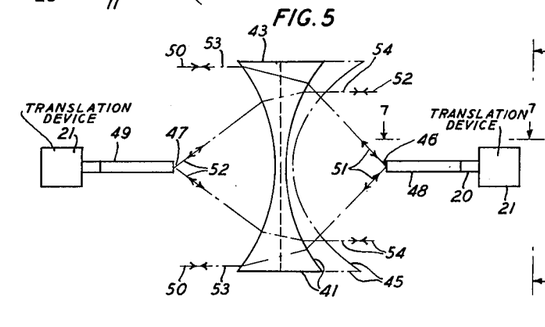
Figs. 5 and 6 are, respectively, side and front views of another embodiment of the invention comprising a biconcave plano-elliptical metal plate lens
Figure 6:
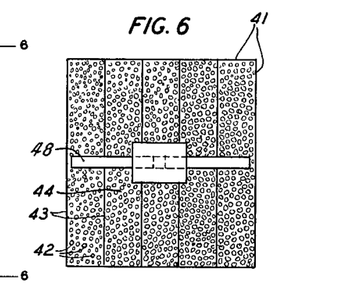

Referring to Figs. 5 and 6, reference numeral 41 denotes a biconcave lens comprising a plurality of identical lens unit 42. Each channel comprises two biconcave vertical metallic plates 43 and in each channel polystyrene foam 44, which is bonded to the plates 43, is utilized as the dielectric medium, instead of air. The foam has a dielectric constant 1.018, substantially equal to unity. The foam type of dielectric channel is disclosed and claimed in my above-mentioned companion application. In Fig. 5, the plano-elliptical unit lens 6 of Fig. 2 is illustrated, for comparison purposes, by the dash-dot line 45 and, as shown in this figure, the thickness $t$ of the biconcave unit 42 or lens 41 varies in the manner corresponding approximately to that of the plano-concave unit 6, the lens 41 being symmetrically concave. The lens 41 has a pair of horizontal conjugate line foci 46, 47 spaced equally from the lens. Numeral 48, Figs. 5, 6 and 7, denotes a flat or so-called sectoral horn connected by a guide 20 to a translation device 21 and having its linear mouth aperture aligned with the line focus 46; and numeral 49 denotes another sectoral horn similar to the horn 48, the horn 49 being connected to another device 21 and having its mouth aperture aligned with the focal line 47.

In operation, Fig. 5, assuming devices 21 are receivers, a plane incoming wave having the direction 50 is focussed by the lens 41 on the line focus 46 and received by horn 48, as shown by arrows 51; and a plane incoming wave having the opposite direction 52 is focussed by the lens 41 on the line focus 47 and received by horn 49, as shown by the arrows 52. Conversely, assuming devices 21 are transmitters, a cylindrical wave front, which is circular in the vertical plane and linear in the horizontal plane, and outgoing from horn 48, is converted by the lens into a plane wave having a direction 53; and a cylindrical wave outgoing from horn 49 is converted into a plane wave having the direction 54. Since each horn produces a horizontal fan beam and the lens produces a vertical fan beam, the resulting beam is a point beam, whereby the system is highly unidirectional in both the E and H planes. It should be observed that, while the lens 6, Figs. 2 and 3, has a pair of conjugate foci, the focussing of a plane wave incoming to the concave surface, at the focus lying on the flat side of the lens, is distorted by reason of undesired aberration. On the other hand, in the system of Figs. 5, 6 and 7 the focusing at each of the foci is sharp, and free from the aforesaid aberration, by reason of the symmetry of the bilateral lens.

Figure 8:
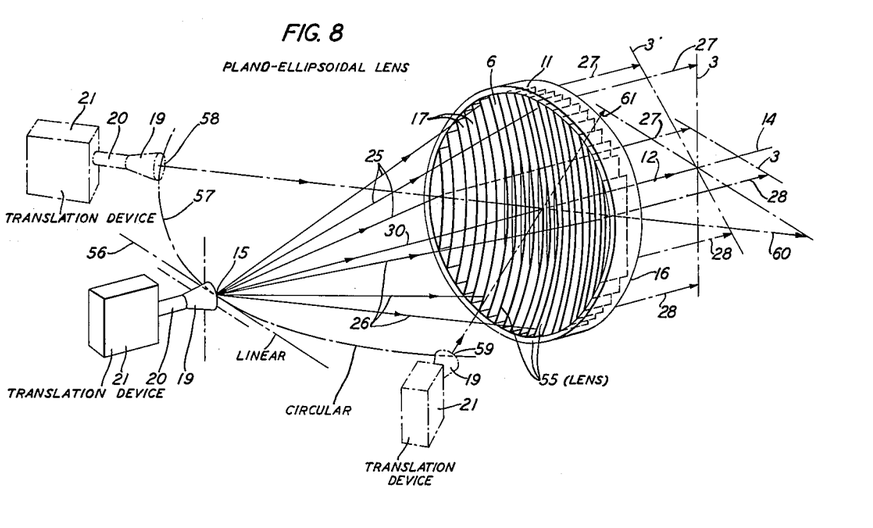
Fig. 8 is a perspective view of another embodiment of the invention comprising a single-zone concave plano-ellipsoidal lens having circular symmetry.

Referring to Fig. 8, reference numeral 55 denotes a plano-ellipsoidal single-zone lens comprising a plurality of vertical plano-elliptical dielectric channels, each of which is similar to the unit channel 6 of Figs. 2 and 3. More specifically, the front face 16 of the lens 55 is flat and the curvature of the concave back face 17 is elliptical in the E or vertical plane and elliptical in the H or magnetic plane. In other words, since the concave surface is ellipsoidal, that is, prolate spheroidal, in any plane containing the axis 14, the elliptical curvature is the same; and the concave surface corresponds to that obtained by revolving an ellipse about its axis. Hence, in practice, the metal plate lens is easily cut or "turned" out from a block member by means of a rotating elliptically-shaped cutting tool. As in Figs. 2 and 3, a point-type of primary antenna 19 is utilized for illuminating the lens or collecting energy therefrom.

In reception, the lens 55 functions to the focus the incoming waves in all axial planes, including both the E and H planes, on the primary antenna 19, and in transmission the converse operation obtains. If the horn 19 is moved along a linear line 56, or a circular line 57, to either of the positions denoted by numerals 58, 59, as in scanning systems, the same focussing action obtains but the direction of maximum action is changed, as shown by arrows 60, 61. As discussed below in detail, the system of Fig. 8 has a point beam directive characteristic. In this connection it should be observed that displacing or moving the horn 19 from the lens axis 14, as in Fig. 8, changes the direction of maximum action, whereas tilting or moving the lens within limits, as in Fig. 4, does not affect the direction of maximum action. In a scanning system, a large scanning sector may be viewed by means of the lens of Fig. 8. Also, the horn 19 of the lens system of Fig. 8 may be moved from the focus 15 or axis 14 a greater distance, than a movable horn in a comparable parabolic reflector system without introducing substantial coma aberration. Hence, from this standpoint, a lens system of the type shown in Fig. 8 is preferred over the reflector system for use in a conical scanning or linear, that is, single-plane, radar scanning system.

Figure 9:
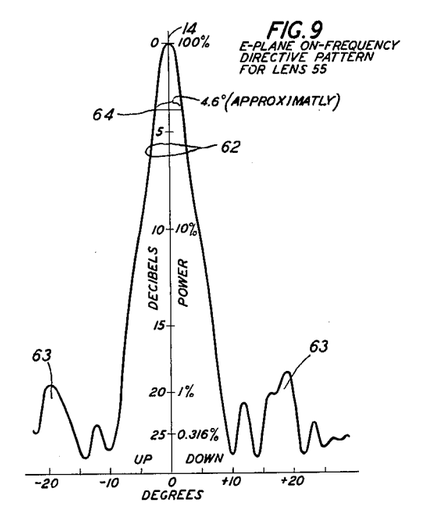
Fig. 9 is a measured electric or "E" plane on-frequency directive pattern and Fig. 10 is a measured magnetic or "H" plane on-frequency directive pattern, taken at the mean frequency of the operating band, of the lens of Fig. 8.
Figure 10:
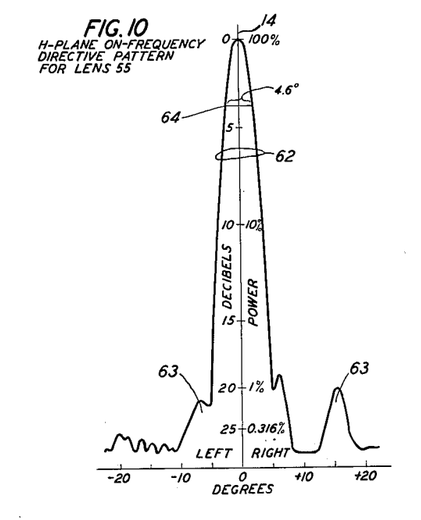

Referring to the E-plane and H-plane directive patterns, Figs. 9 and 10, respectively, taken at the mean wavelength of 3.4 centimeters for the single-zone system of Fig. 8, numerals 62 denotes the major lobe and numerals 63 designates the minor lobes. The minor lobes in each pattern are about 19 decibels down and therefore relatively low and negligible. The half-power widths of the two major lobes 62, taken at the 3 decibel points 64 are about equal, whereby the beam is of the point type, as stated above. The half-power width is about 4.6 degrees, and the beam is therefore fairly narrow. The directivity gain is about 29.6 decibels and therefore relatively large.

Figure 11:
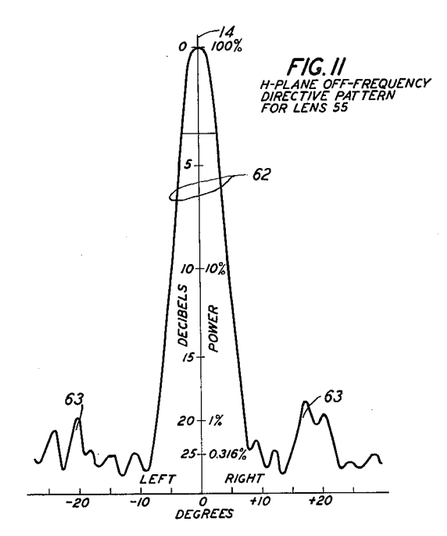
Fig. 11 is a measured H-plane off-frequency directive pattern, taken at a different frequency in the band, of the lens of Fig. 8.
Figure 12:
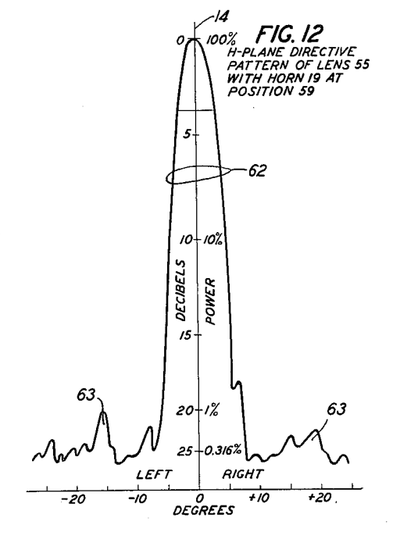
Fig. 12 is a measured H-plane on-frequency directive pattern of the lens of Fig. 8, taken at the mean frequency and with the primary antenna displaced from the focal point of the lens.

The lens 55 also performs satisfactorily over a band of frequencies since the off-frequency H-plane pattern, Fig. 11, taken at a wavelength of 3.095, compares favorably with the on-frequency H-plane pattern of Fig. 10. Fig. 12 illustrates the H-plane pattern obtained with the horn 19, Fig. 8, displaced from the lens focus and at position 59. The pattern of Fig. 12 is not materially different from that of Fig. 10 so that displacing the horn from the lens axis does not unfavorably affect the directivity.

Figure 13:
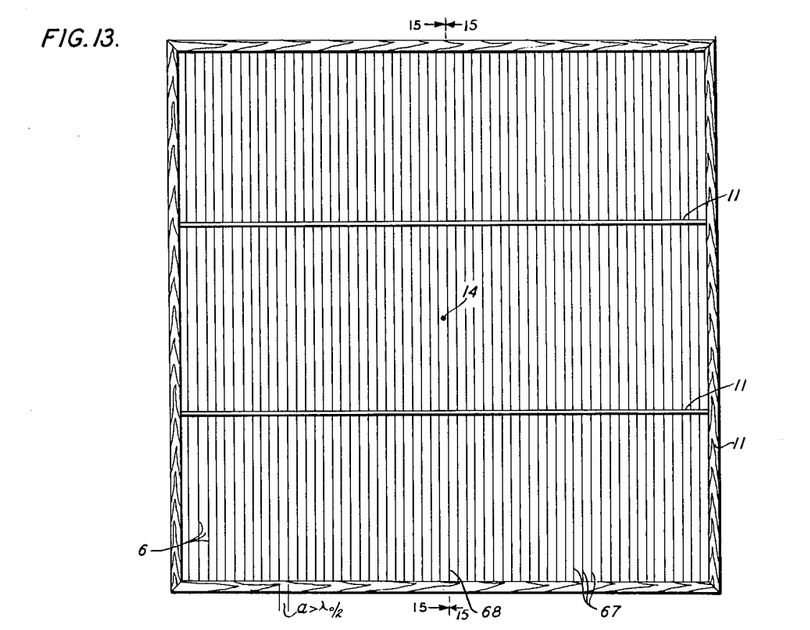
Figs. 13 and 14 are, respectively, front and back views of another embodiment of the invention comprising a concave multiple-zone stepped plano-ellipsoidal lens.
Figure 14:
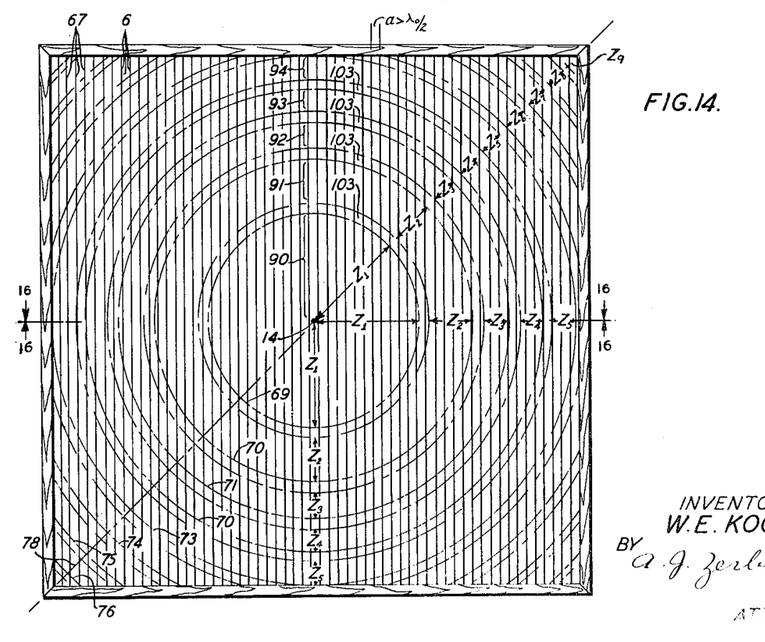
Figure 15:
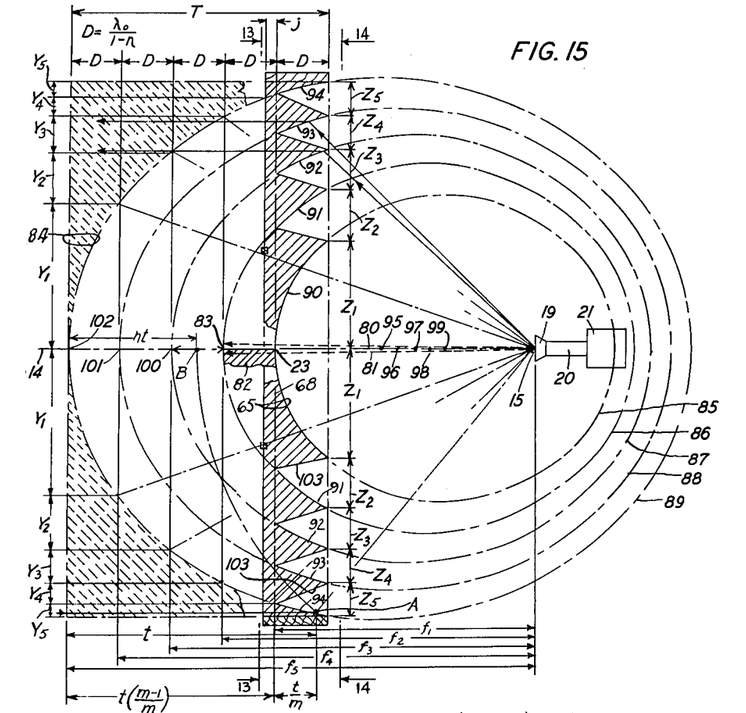
Fig. 15 is a pattern or trace of the lens of Figs. 13 and 14, taken in the vertical plane approximately containing the lens axis.
Figure 16:
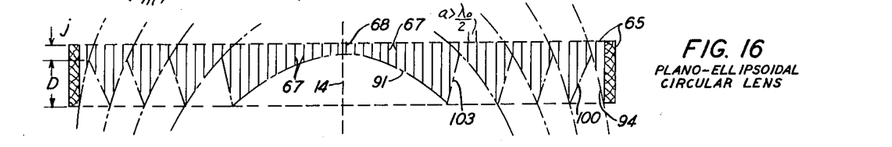
Fig. 16 is a pattern of the same lens taken in the horizontal plane containing the aforesaid lens axis.

Referring to Figs. 13, 14, 15 and 16, numeral 65 denotes a stepped multiple-zone, circularly-symmetrical lens having a square periphery and comprising a large number, say 60 to 70, of dielectric channels. Each channel is similar to the unit lens 6 of Figs. 2 and 3 and comprises a pair of stepped metallic plates 67 which are spaced a half wavelength or more apart. As is apparent from Fig. 16, no two of the plates 67 are identical in shape or curvature. In so far as plate contour is concerned, Fig. 15 illustrates only one plate, namely, plate 68 adjacent the lens axis 14 in Figs. 13 and 14. The plates are held in position by the wooden frame members 11 and wooden cross members or studs 11. The lens is stepped radially, that is, in all planes containing the lens axis 14. In Fig. 14 numerals 69 to 77 inclusive, denote the concentric outer or back peripheries of the zones. As shown in Figs. 14, 15 and 16, the lens 65 has five concentric zones $Z_1$, $Z_2$, $Z_3$, $Z_4$ and $Z_5$ in the vertical plane, five similarly designated zones in the horizontal plane and nine zones denoted $Z_1$ to $Z_9$, inclusive, in the oblique plane of the diagonal 78, Fig. 14. The lens may, of course, have in any plane a different number of zones. As will be explained, the faces of the zones, or facets, lie along different elliptical curves. As in Figs. 2 and 8, a point type primary antenna 19 is positioned at the focal points 15 of the lens of Figs. 13, 14, 15 and 16, as shown in Fig. 15.

As will be mathematically demonstrated below, the number $m$ of zones in a given lens and the positions of the zone peripheries 69 to 77 inclusive, are dependent upon the refractive index $n$ and the free space wavelength $\lambda_0$. The rough or thumb rule, applicable to a lens, for ascertaining the number $m$ of zones and the positions of the zone peripheries is as follows: Assuming the lens thickness at the vertex 23 is zero and proceeding outwardly and radially from the vertex, the first zone periphery 69 occurs at the point at which the lens thickness, D, is approximately a wavelength or, more accurately, $$\frac{\lambda_0}{1-n}=D \quad (27)$$

Assuming the lens is stepped back a distance D to the plane of the vertex and proceeding outwardly along a different ellipse, the position of the second zone periphery 70 is reached at the point where the lens thickness is again equal to D. By way of contrast, the zones of a multiple zone parabolic reflector differ in certain aspects from the zones of the lens, since the zone positions in a reflector are not dependent upon a refractive index. Also, in a stepped reflector "half-wave" stepping is used whereas in the lens "full-wave" stepping is employed. In addition, the bandwidth of an unstepped or stepped multiple-zone lens is inversely proportional to the number of zones. Stepping the zones of the lens of the invention increases the lens bandwidth. On the other hand, an unstepped parabolic reflector has an infinite bandwidth; and stepping the reflector decreases the reflector bandwidth. Again, a large multiple-zone parabolic reflector, if stepped, is in general only stepped for the purpose of reducing the thickness of the reflector whereas, in a multiple-zone lens, stepping is employed primarily for increasing the bandwidth and secondarily for reducing the thickness. Moreover, as will be disclosed and claimed in my proposed application, stepping of a primary lens or a correcting lens is highly advantageous in a compound or achromatic lens.

In more detail, the effective zone thickness D, mentioned above, of the stepped multiple zone lens and, in particular, the effective width of the central plate 68, Fig. 15, coincident with the vertical plane axial section and the effective zone thickness D in the horizontal plane axial section, Fig. 16, is determined as follows: In Fig. 15, assuming ray 80 from horn 19 is propagated entirely through free space having a phase velocity $v_0$, and the ray 81 is propagated from horn 19, a focal distance $f$ through free space and a distance D through a unit channel represented by broken plate section 82, the time taken by ray 80 and the time taken by ray 81 to reach the vertex 23 are equal. The time, $t_1$, taken by ray 80 to traverse the distance D in free space and reach point 83, is $$t_1=\frac{D}{v_0} \quad (28)$$

and the time, $t_2$, taken by ray 81 to traverse the distance D in the lens channel and reach point 83 is $$t_2=\frac{D}{v} \quad (29)$$

But,
$$v>v_0 \quad (30)$$

therefore,
$$t_2<t_1 \quad (31)$$

The difference
$$t_1-t_2 \quad (32)$$

should equal the time taken by a ray to traverse in free space a distance equal to one wavelength, as measured in space, that is $$t_1-t_2=\frac{\lambda_0}{v_0} \quad (33)$$

or, $$\frac{D}{v_0}-\frac{D}{v}=\frac{\lambda_0}{v_0} \quad (34)$$

$$D\left(1-\frac{v_0}{v}\right)=\lambda_0 \quad (35)$$

But, $$\frac{v_0}{v}=n \quad (36)$$

so that $$D=\frac{\lambda_0}{1-n} \quad (37)$$

Assuming the refractive index $n$ is independent of wavelength, a change in the wavelength $\lambda_0$ alters only the right side of Equation 35. Thus, for the first zone, $Z_a$, a change from $\lambda_0$ to 1.25 $\lambda_0$ produces a phase discrepancy in the wave front of 90 degrees, that is, $\lambda_0/4$. For the $m^{th}$ zone, the quantity on the right side of Equation 35 becomes equal to the product of $m$ and $\lambda_0$. Hence, as the number of zones increases, the phase discrepancy becomes greater; and the bandwidth is therefore proportional to $$\frac{1}{m} \quad (38)$$

For example, the lens of Figs. 13, 14, 15 and 16 having five zones, produces a uniphase front within less than 45 degrees or $\lambda_0/8$ over a 6 per cent frequency band.

In Fig. 15, reference numeral 84 denotes an unstepped multiple-zone plate which is comparable in aperture and number of zones to the five-zone stepped plate 68 and is shown here for explanatory purposes. The plate is part of a channel and has a maximum thickness T of about five wavelengths, or 5D. The five zones of the unstepped plate or unit are denoted $Y_1$, $Y_2$, $Y_3$, $Y_4$ and $Y_5$. Note that zones $Y_1$, $Y_2$, $Y_3$, $Y_4$ and $Y_5$ differ in radial width from zones $Z_1$, $Z_2$, $Z_3$, $Z_4$ and $Z_5$ of the stepped plate 68 having a maximum thickness of D. This results from the fact that the unstepped plate 84 has a constant focal length, $f_5$, whereas the stepped plate has five different focal lengths $f_1$, $f_2$, $f_3$, $f_4$ and $f_5$; and the focal length $f_1$, of the first zone $Z_1$ of the stepped plate is about five wavelengths, or 5D, shorter than the single focal length, $f_5$, of the unstepped plate, and the focal length, $f_5$, of the fifth zone, $Z_5$, is equal to the focal length of the unstepped plate. In short, the thickness in wavelengths of a multiple zone lens and the number of zones are approximately the same. The maximum width of plate 68 and the maximum thickness $t$ of the lens 65 are preferably greater than D, a thickness $j$ being added to the stepped plate for the purpose of securing mechanical rigidity. For purpose of explanation, however, the thickness D is taken as the effective thickness of the lens 65. In Fig. 15, numerals 85, 86, 87, 88 and 89 denote the ellipses corresponding to the facets 90, 91, 92, 93, 94 of zones $Z_1$, $Z_2$, $Z_3$, $Z_4$ and $Z_5$, respectively; and numerals 95, 96, 97, 98 and 99 denote the centers of the ellipses 85, 86, 87, 88 and 89.

The equation for ellipse 85, the origin being taken at vertex 23, is the same as that given in Equation 5 for the ellipse of Fig. 2, that is, $$(1-n^2)x^2-2f(1-n)x+y^2=0 \quad (39)$$

The equations for ellipses 86, 87, 88 and 89, with the origin at the vertices 83, 100, 101, 102 of these ellipses, may be obtained by adding $$\frac{(E-1)\lambda_0}{1-n} \quad (40)$$

to $x$ and $f$ in Equation 39, where E is the number of the zone, $Z_1$ being zone number one. Thus, we have the following Equations 41, 42, 43 and 44 for ellipses 86, 87, 88 and 89, respectively, $$(1-n^2)\left(x+\frac{\lambda_0}{1-n}\right)^2-$$
$$2\left(f+\frac{\lambda_0}{1-n}\right)(1-n)\left(x+\frac{\lambda_0}{1-n}\right)+y^2=0 \quad (41)$$

$$(1-n^2)\left(x+\frac{2\lambda_0}{1-n}\right)^2-$$
$$2\left(f+\frac{2\lambda_0}{1-n}\right)(1-n)\left(x+\frac{2\lambda_0}{1-n}\right)+y^2=0 \quad (42)$$

$$(1-n^2)\left(x+\frac{3\lambda_0}{1-n}\right)^2-$$
$$2\left(f+\frac{3\lambda_0}{1-n}\right)(1-n)\left(x+\frac{3\lambda_0}{1-n}\right)+y^2=0 \quad (43)$$

$$(1-n^2)\left(x+\frac{4\lambda_0}{1-n}\right)^2-$$
$$2\left(f+\frac{4\lambda_0}{1-n}\right)(1-n)\left(x+\frac{4\lambda_0}{1-n}\right)+y^2=0 \quad (44)$$

Note that the centers of the ellipses are displaced from each other and, in a direction looking from the vertices, the elliptical facets converge slightly. The lens optical focal point 15, correspondingly to the common focal point for the facets 90, 91, 92, 93 and 94, is not by design superimposed on a mathematical focus of any ellipse.

In the case of each plate 67, the inclined plate edge which constitutes a zone step 103 and extends between the outermost periphery or point of one zone facet, for example, facet 92, and the adjacent outer facet, for example, facet 93, has a length and inclination such that the maximum effective thickness D and the minimum thickness $j$ are constant. In other words, the stepping is such that the junction points formed by each step 103 and the zone facet immediately above the step lie on a straight line perpendicular to the lens axis 14 and passing through the vertex 23, and the peripheries or outer zone points also lie on a straight line perpendicular to axis 14. By virtue of the particular inclination of the steps 103, shadow and diffraction effects at the zone peripheries are both reduced; and this type of stepping, hereinafter termed "compromise" or "intermediate" stepping, is preferred over the "low" type of stepping, which is flat and parallel to axis 14, and preferred over the "high" type of stepping which is coincident with a radial line passing through the focal point. Low stepping in a zoned reflector is disclosed in Patent 1,906,546 to R. H. Darbord, and both low and high steppings, in a zoned reflector, are disclosed in the copending application of W. D. Lewis, Serial No. 574,396, filed July 31, 1944.

Figure 17:
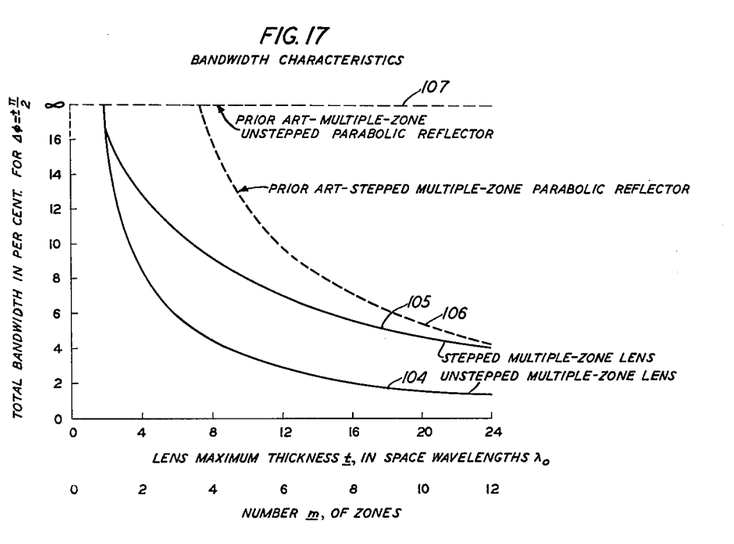
Fig. 17 is a set of calculated curves illustrating the bandwidth characteristics of an unstepped lens and a stepped lens, both constructed in accordance with the invention, and an unstepped reflector and a stepped reflector, both of the prior art.

The band width curve 104, Fig. 17, for an unstepped lens comprising a plurality of metal plates 84, Fig. 15, may be obtained in the manner now to be explained. This curve illustrates the relation between the thickness in space wavelengths and the frequency as measured in per cent of the design frequency. Assuming an incoming wave arrives at points A and B, the phase $\Phi_A$ at A is $$\Phi_A=\frac{2\pi t}{\lambda}=\frac{2\pi t}{\lambda_0}\sqrt{1-\left(\frac{\lambda_0}{2a}\right)^2} \quad (45)$$

where, as before, "$t$" is the variable thickness and $a$ is the spacing between plates. Now, at the design wavelength, which is the wavelength of the median or middle frequency of the band of frequencies with which the device is to be used and which will be designated hereinunder as $\lambda_d$, $$n=\sqrt{1-\left(\frac{\lambda_d}{2a}\right)^2} \quad (46)$$

Therefore, $$\left(\frac{1}{2a}\right)^2=\frac{1-n^2}{\lambda_d^2} \quad (47)$$

so that $$\Phi_A=\frac{2\pi t}{\lambda_0}\sqrt{1-(1-n^2)\left(\frac{\lambda_0}{\lambda_d}\right)^2} \quad (48)$$

The phase $\Phi_B$ at B is $$\Phi_B=\frac{2\pi}{\lambda_0}nt \quad (49)$$

Therefore, $$\Phi_A-\Phi_B=\frac{2\pi t}{\lambda_0}\left[\sqrt{1-(1-n^2)\left(\frac{\lambda_0}{\lambda_d}\right)^2}-n\right] \quad (50)$$

By letting $$n=\tfrac{1}{2} \quad (51)$$

and putting $$\Phi_A-\Phi_B=\Delta\Phi=\pm\frac{\pi}{2} \quad (52)$$

the curve 104, Fig. 17, for the unstepped lens comprising plate 84 was obtained.

The equation for the band width curve 105, for the stepped lens comprising the stepped plate 68, may be obtained in the following manner. Curve 105 illustrates the relation between the number $m$ of stepped zones and the frequency as measured in percent of the design frequency. The thickness $t$ of the unstepped lens 84 may be expressed $$t=\frac{m\lambda_d}{1-n} \quad (53)$$

where as before $m$ equals the number of zones. The phase $\Phi_A$ at A is $$\Phi_A=\frac{2\pi t}{\lambda_0}\left(\frac{m-1}{m}\right)+\frac{2\pi t}{\lambda_0 m}\sqrt{1(1-n^2)\left(\frac{\lambda_0}{\lambda_d}\right)^2} \quad (54)$$

and the phase $\Phi_B$ at B is $$\Phi_B=\frac{2\pi nt}{\lambda_0} \quad (55)$$

so $$\Phi_A-\Phi_B=\frac{2\pi t}{\lambda_0}\left[\frac{m-1}{m}+\frac{1}{m}\sqrt{1-(1-n^2)\left(\frac{\lambda_0}{\lambda\phi_d}\right)^2}-n\right] \quad (56)$$

when $$\frac{\lambda_0}{\lambda_d}=1 \quad (57)$$

we have $\Phi_A-\Phi_B=2\pi(m-1)$, an integral number of wavelengths (58)

and when $$\frac{\lambda_0}{\lambda_d}\neq 1 \quad (59)$$

$$\Phi_A-\Phi_B=2\pi(m-1)\pm\Delta\Phi \quad (60)$$

where $\Delta\Phi$ is the phase discrepancy. Therefore, since $$t=\frac{m\lambda_d}{(1-n)} \quad (61)$$

the band width may be found by solving $$2\pi(m-1)\pm\Delta\Phi=$$
$$\frac{2\pi\lambda_d m}{\lambda_0(1-n)}\left[\frac{m-1}{m}+\frac{1}{m}\sqrt{1-(1-n^2)\left(\frac{\lambda_0}{\lambda\phi_d}\right)^2}-n\right] \quad (62)$$

By letting $$n=\tfrac{1}{2} \quad (63)$$

$m$ being variable and $$\Delta\Phi=\frac{\pi}{2} \quad (64)$$

the curve 105, Fig. 17, for the stepped lens was obtained. The equation of the band width curve 106 for the prior art stepped parabolic reflector, such as that disclosed in Patent 1,906,546 to R. H. Darbord, is readily obtainable. The band width curve 107 for the conventional prior art unstepped parabolic reflector is linear, and horizontal or flat, since this type of reflector has an infinite band width.

In Fig. 17 it will be noted that stepping the lens raises the characteristic, so to speak, from the position 104 to the position 105, and hence increases the band width. On the other hand, stepping the prior art parabolic reflector lowers the characteristic from position 107 to position 105, and therefore decreases the band width. As shown by curve 104, increasing the thickness of an unstepped lens decreases the band width.

Figure 18:
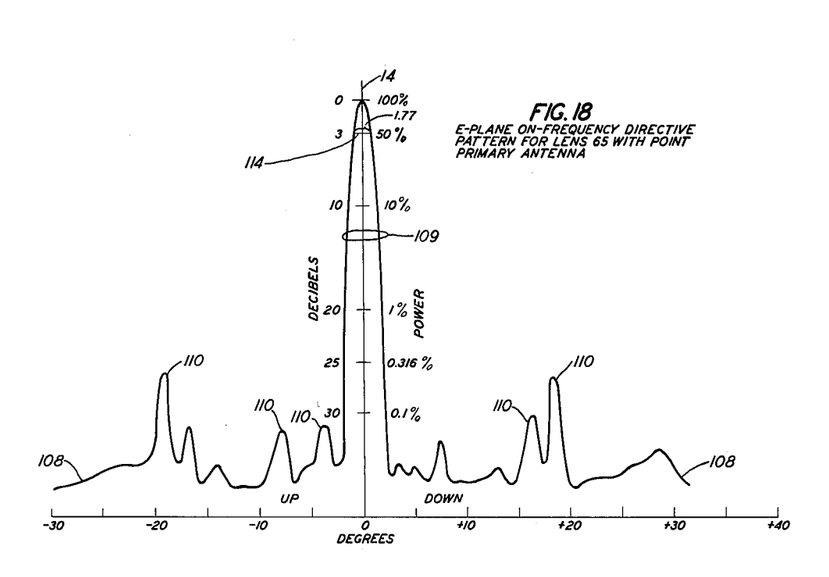
Figs. 18 and 19 are respectively, measured E-plane and H-plane on-frequency directive patterns of the stepped lens of Figs. 13, 14, 15 and 16.
Figure 19:
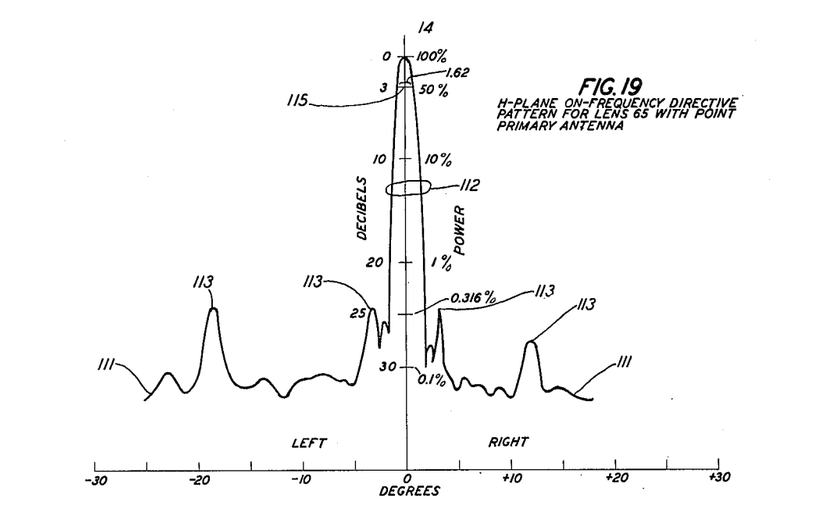

Referring to Figs. 18 and 19, reference numeral 108 denotes the E-plane directive pattern comprising the major lobe 109 and the minor lobes 110 and numeral 111 denotes the H-plane directive pattern comprising the major lobe 112 and the minor lobes 113, taken at the design or mean wavelength of 3.3 centimeters, for the lens of Figs. 13, 14, 15 and 16. Numerals 114 and 115 denote, respectively, the half power points of the E-plane major lobe 109 and the H-plane major lobe 112. As is apparent from these figures, the system has a point beam, since the half power lobe width 114 and 115 are substantially equal. Moreover, the point beam is extremely sharp since the major lobe width 114 in the E-plane is only 1.77 degrees and the major lobe width 115 in the H-plane is only 1.62 degrees. Also the patterns are highly satisfactory since the E-plane minor lobes 110 are about 27 decibels below the peak of the major lobe 114, that is, in terms of power less than 0.316 per cent of the major lobe 114; and the H-plane minor lobes 113 are about 24 decibels below, or down from, the major lobe 112 and slightly more than 0.316 per cent of major lobe 115. In prior art reflector systems the minor lobes are usually only about 18 to 20 decibels below the major lobe.

Figures 20, 23:
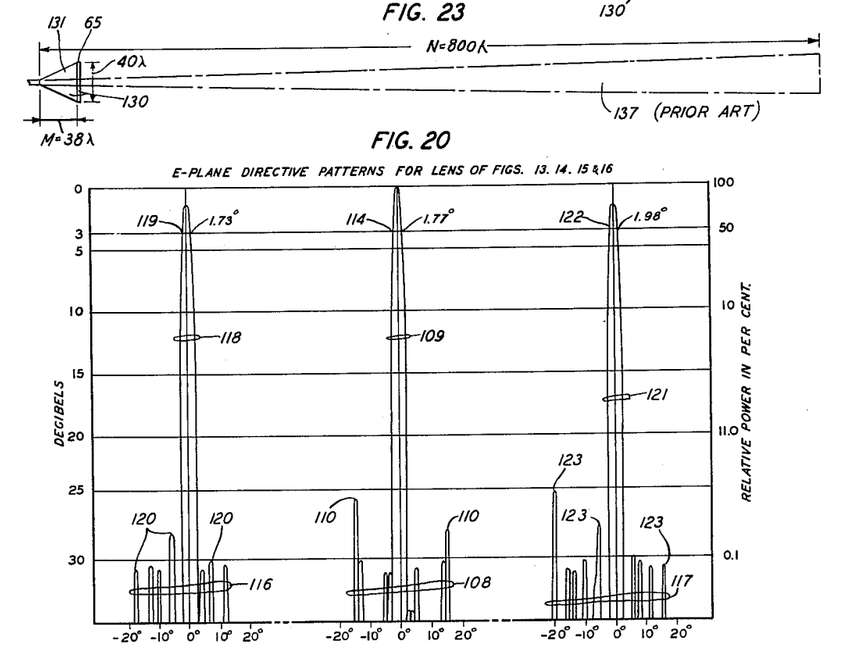
Fig. 20 is a set of three measured E-plane directive patterns of the lens of Figs. 13, 14, 15 and 16, taken at the mean and extreme frequencies of a twelve per cent frequency band.
Fig. 23 is explanatory and illustrates the difference between the axial lengths of a horn having a mouth lens and constructed in accordance with invention, as shown in Fig. 22, and a comparable prior art optimum-angle horn not equipped with a lens.

In Fig. 20, the pattern 108 is the same as that shown in Fig. 18. Numeral 116 denotes the E-plane pattern taken at a wavelength equal to the design wavelength minus six per cent of the design wavelength, that is, at about 3.102 centimeters; and numeral 117 denotes the E-plane pattern taken at a wavelength equal to the design wavelength plus six per cent of the design wavelength, that is, about 3.498 centimeters, for the system of Figs. 13, 14, 15 and 16 including the lens 65. Pattern 116 comprises the major lobe 118 having a half power width 119 and minor lobes 120; and pattern 117 comprises the major lobe 121 having a half power width of 122 and minor lobes 123. The lobe width 119 is 1.73 degrees and the lobe 122 is 1.98 degrees, so that the major lobes are substantially alike; and the system including lens 65 has the same sharpness or highly unidirective action over the entire ±6 per cent. In addition, at the extreme wavelengths in the band, the minor lobes 120 and 123 are more than 25 decibels down, substantially, as in the pattern 108 for the design wavelength. Hence, the directive action is highly satisfactory over the band.

Figure 21:
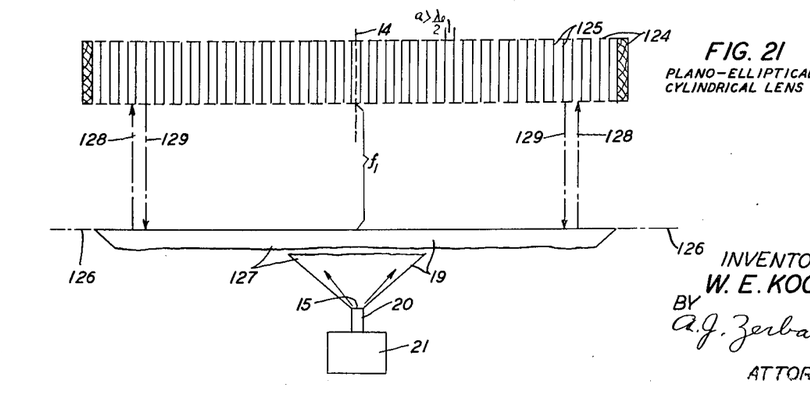
Fig. 21 is a horizontal plane, center or axial, pattern of another embodiment of the invention comprising a concave multiple-zone stepped plano-elliptical lens having cylindrical symmetry.

Referring to Fig. 21, reference numeral 124 denotes a stepped, five-zone, cylindrically symmetrical, lens comprising a plurality of similar plates 125 each of which is the same as plate 68, Fig. 15. Hence the plate 68, Fig. 15, constitutes a partial sectional side view of the lens 124 of Fig. 21. As in the lens 42 of Figs. 5, 6 and 7, the lens 124 has a line focus 126, and the plate 125 constitute conductive elements extending in the direction of desired wave propagation. Numeral 127 denotes an optimum angle sectoral horn similar to the horn of Figs. 5, 6 and 7 and having its linear mouth aperture aligned with the line focus 126 of lens 124.

In transmission, Fig. 21, the lens 124 is illuminated by the horn, as indicated by arrows 128, and in reception the lens focusses the energy on the line focus 126 and the mouth aperture of the horn, as indicated by arrows 129. The lens 124 and horn 127 have perpendicular fan beams, whereby a point beam is secured. More specifically, assuming the focal line 126 and the H-plane are horizontal, the horn produces unidirective action in the H-plane; and the lens focusses the waves in the E-plane, and hence produces unidirective action in the E-plane. Consequently, the complete system including the lens and the horn focusses, in effect, the waves in all planes containing the lens axis 14.

Figure 22:
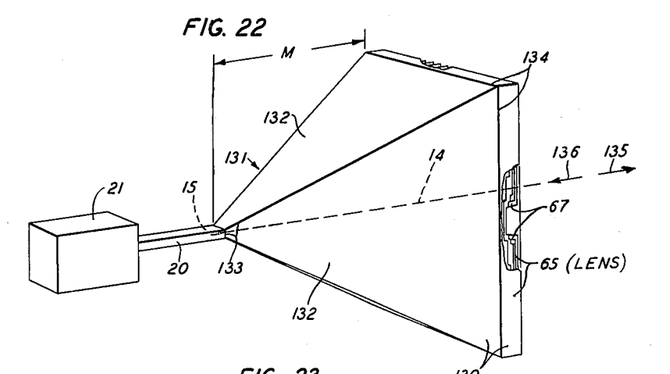
Fig. 22 is a perspective view of another embodiment of the invention comprising a pyramidal horn equipped with the concave stepped circularly symmetrical lens of Figs. 13, 14, 15 and 16.

Referring to Figs. 22 and 23 reference numeral 130 designates a unidirectional horn antenna comprising pyramidal horn 131 having similar sides 132 and equal vertical plane and horizontal flare angles. Numerals 133 and 134 denote the throat aperture, and the square mouth aperture of horn 130, respectively, the throat aperture constituting a primary antenna member. The throat aperture 133 is connected by guide 20 to a translation device which may be a transmitter, a receiver, or a radar transceiver. A stepped, multiple zone, circularly symmetrical, square lens 65, as illustrated by Figs. 13, 14, 15 and 16, is mounted in or at the mouth aperture 124, the focal point 15 of the lens being in the vicinity of the center of the horn throat aperture. If desired, the lens may be tilted, as shown in Fig. 4, for minimizing reflective effects. The horn sides, aside from guiding the transmitted or received wavelets between the lens and the throat aperture, function as shields for preventing undesired energization of both the back face of the lens and the primary antenna member or throat by extraneous and interfering waves. The lens metallic structure in the horn mouth aperture constitutes a convenient mechanical support for a solid dielectric weatherizing cover which may be used for protecting the lens against sleet and ice formation.

In operation, Fig. 22, maximum transmitting action occurs in direction 135 and maximum receiving action occurs in the opposite direction 136 both of which are aligned substantially with the length dimension M and the common axis 14 of the horn antenna 130 or lens 65. In one embodiment tested with success and proposed for use at about 7.5 centimeters, the area of the square mouth aperture is 40 square wavelengths, and the axial length is about 38 wavelengths. As shown in Fig. 23, the axial length M of a horn 130 having the dimension just specified is relatively small, and only about one-twentieth of the length N of a comparable prior art optimum angle horn having a mouth aperture of 40 square wavelengths and the mouth aperture of which does not contain a lens of the type disclosed herein. More particularly, whereas the horn antenna 130 of the invention is about 38 wavelengths or 10 feet long, at about 7.5 centimeters, the prior art open mouth optimum angle horn 137 is about 800 wavelengths or 200 feet long. Increased gain over the optimum horn 137 is also achieved by means of the lens 65 in the antenna 130; and, by means of the lens 65, the gain of antenna 130 may be made to approach that of an infinitely long horn. The effective area of an optimum horn flared in both planes is approximately 45 per cent of its actual area, whereas a similar horn infinitely long has an effective area which is about 81 per cent of its actual area. By way of further comparison, a prior art horn antenna comprising a horn having in its mouth aperture a solid dielectric lens, and comparable in gain and directive operation with the horn antenna 130 and the prior art optimum angle horn 137, has a mouth area, and lens, greater than 40 square wavelengths, the larger area of the horn and lens aperture being required in order to compensate for the attenuation in the solid dielectric lens.

Figures 24, 25, 26:
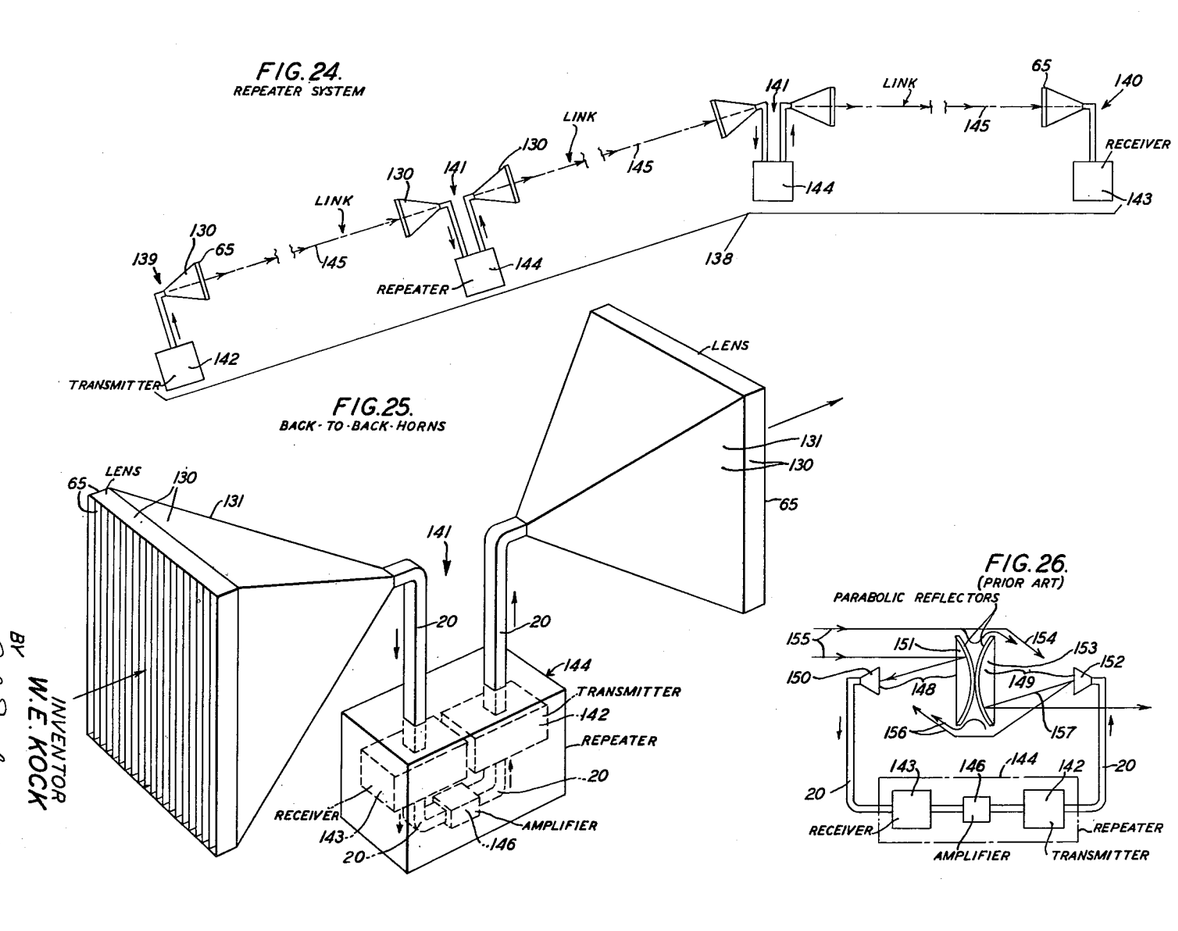
Fig. 24 illustrates a linear or straight-through repeater system comprising several repeater stations, each constructed in accordance with the invention.
Fig. 25 is a diagrammatic perspective view of a repeater station employed in the system of Fig. 24 and comprising a pair of back-to-back receiving-transmitting horns, each constructed in accordance with Fig. 22.
Fig. 26 is an explanatory side view of a prior art repeater station comprising a pair of back-to-back paraboloidal reflectors.

Referring to Fig. 24, reference numeral 138 denotes a straight-through repeater system comprising a pair of widely separated terminal stations 139, 140 and a plurality of spaced repeater stations 141. Numeral 142 denotes a transmitter at one terminal station and numeral 143 designates a receiver at the other terminal station. In one proposed microwave repeater system, the terminal stations are about 250 miles apart and the adjacent repeater stations 141 are located about 30 miles apart. For one-way repeater operation, each repeater station 141 comprises a repeater 144 and a pair of transmit-receive back-to-back horn antennas 130, each of the type illustrated by Fig. 22, for receiving from one direction and transmitting in the opposite, or at least in a different, direction. For two-way operation, each repeater station comprises two pairs of back-to-back horns for receiving in different directions and transmitting in different directions. The horns 130 at each station may face in opposite directions or in directions forming an angle less than 180 degrees. In the one-way system, different frequencies and/or different polarization may be employed for the purpose of preventing cross-talk and interaction between the adjacent links 145, that is, between the oppositely directed waves incoming and outgoing from each repeater station. In the two-way system, different frequencies and/or polarizations may be employed for preventing interaction between the oppositely propagated waves in each link.

As shown in more detail in Fig. 25, each repeater 144 comprises a receiver 143 connected through an amplifier 146 by guides 20 to a transmitter 142, the repeater being connected by guides or lines 20 between the two throat apertures of the back-to-back horns 130. For purpose of explanation, Fig. 26 illustrates a repeater station 147 comprising a repeater 144 connecting a receiving antenna 148 and a transmitting antenna 149. The receiving antenna 148 comprising a primary antenna 150 and a parabolic reflector 151 and the transmitting antenna 149 comprises a primary antenna 152 and a parabolic reflector 153, the two reflectors being positioned back-to-back. As shown by arrows 154, a portion of the incoming energy or wave 155 spills over the reflectors 151, 153 by reason of diffractive effects, whereby the transmission from horn 152 and antenna 149 is affected detrimentally and cross-talk is produced. Conversely, as shown by arrows 156, the wave 157 transmitted by horn 152 spills over the two reflectors 151 and 153 and unfavorably changes the reception by horn 150. By way of contrast, the back-to-back horns 130, Figs. 24 and 25, are free of this diffractive effect and such antennas 130 are markedly superior to prior art back-to-back parabolic reflector systems as regards cross-talk and interaction effects. It may be added that such back-to-back horns 130 are, as regards the effects mentioned above, markedly superior to the prior art back-to-back drum reflectors, such as that illustrated by Fig. 4 of Patent 2,169,553 granted E. Bruce, which are comparable, as regards these mutual coupling effects, to the back-to-back parabolic reflectors.

Thus, as explained above, a highly satisfactory passive antenna member, or lens, comprising one or more unit lenses 6, is obtained in accordance with the invention. It may be observed that the refractive index $n$, of a unit lens 6 comprising two plates 7 separated by a dielectric medium 8 having a dielectric constant $\epsilon$, is $$n \sqrt{\epsilon - \left(\frac{\lambda}{2a}\right)^2} \qquad (65)$$

Therefore, if $\epsilon$ has a value larger than unity, $n$ may still be made less than unity, by proper choice of the channel width $a$. Hence, the medium 8 utilized may be a vacuum or air, each of which has a dielectric constant of unity, or it may be a conventional solid dielectric substance such of, for example, polystyrene having a dielectric constant of 2.6; and a value of $n$ less than unity may be obtained by choosing a proper value for $a$. In more detail, since air and polystyrene foam have approximately the same dielectric constant, to wit, unity, as already discussed, the physical or actual widths, $a$, of the air and foam channels are the same. If, however, conventional polystyrene having a dielectric constant of 2.6 were used in applicant's lenses in place of polystyrene foam or air, in order to secure a refractive index $n$ less than unity, as desired, the physical, but not the electrical, value of dimension $a$ must of necessity be smaller, as is obvious from Equation 65, than the physical value of $a$ in the foam and air channels. In particular, the dielectric element in each of the lens illustrated on the drawing may have a foam dielectric element instead of the gas-like air dielectric medium.

In connection with the above, a sharp distinction should be made between the solid dielectric optical and radio lenses of the prior art, as illustrated by Fig. 1 and the lenses of the invention. As far as is known, the "simple" lenses of the prior art are homogeneous throughout as, for example, glass or polystyrene, whereas the unit simple lens of the invention is heterogeneous, since it comprises at least one conductive or metallic element, and a dielectric element or medium 8, Fig. 3, which may be a vacuum having a dielectric constant of unity or a gas-like gaseous liquid or solid dielectric substance having a dielectric constant of unity or greater. The term "simple lens" refers to a positive that is, a converging lens or to a negative, that is, a diverging lens, each of which is chromatic, and this term is used in contradistinction to the term "compound" which refers to an achromatic combined positive-negative or converging-diverging lens. As already discussed, the phase velocity, $v$, in the prior art lenses, is smaller than the phase velocity, $v_0$, in free space and the refracted rays are retarded in phase in passing through the lens, whereas, in the particular embodiments of the invention described herein, the phase velocity, $v$, in the lens is larger than the phase velocity, $v_0$, in free space, and the phases of the refracted rays are accelerated in passing through the lens. Hence, the prior art lenses are, for the sake of brevity and convenience, sometimes referred to as "slow" lenses; and the lenses of the particular embodiments of the invention described herein are sometimes called "fast" lenses.

In addition, as is believed to be apparent from the foregoing explanation and will now be recapitulated, the principle of operation of the heterogeneous lenses of the invention as, for example, unit lens 6, is radically different from the homogeneous lenses, including optical and radio lenses of the prior art. First of all, considering the operation at a single frequency, in both the prior art homogeneous lens and the heterogeneous lens of the invention, the focusing action is dependent upon the refractive index, $n$, and, therefore, upon the phase velocity characteristic $v$ of the lens. The refractive index, in the embodiments of the invention described herein, is dependent in part on the dielectric constant $\epsilon$ of the dielectric element or medium and also dependent in part on a dimension, namely, dimension $a$, taken in a plane perpendicular to the plane or planes of focusing action. This is true because, as shown by the Equation 65 the refractive index, $n$, varies inversely with the phase velocity characteristic, $v$, of the channel and $v$ is dependent on dimension $a$. In constrast, in the prior art lenses, the lens action is dependent only on the dielectric constant, substantially, or stated conversely, the lens action is not critically dependent on a lens dimension taken in a plane perpendicular to the focusing plane, that is, the wave propagation plane. Hence, at a given frequency, the refractive index $n$ of a given prior art lens is constant, and independent of the lens dimensions. On the other hand, the refractive index $n$, of the metallic lens of the invention is critically dependent upon a lens dimension. Moreover, while both the simple unstepped lens of the invention and the simple prior art lens are more or less chromatic, the dispersive effect of the prior art lens is caused only by the change, substantially, with frequency of the dielectric constant of the medium, such as glass. On the other hand the dispersive effect of the focusing metallic refractors of the invention, and of the non-focusing refractor of my copending companion application, results primarily from a variation with frequency in dimension $a$, as measured in wavelengths, the dielectric constant of the medium, such as air, being independent of frequency.

To continue, as is known, the attenuation in the dielectric channel, as is a conventional dielectric guide, is inversely proportional to the E-plane or $b$ dimension and directly proportional to the axial length, of the channel; and, assuming the axial length, that is, the dimension coincident with the wave propagation path, is long and the $b$ dimension is greater than a half wavelength, second and higher order modes may be established. In so far as these modes are concerned, the axial length or thickness $t$ of the metallic lens of the invention is exceedingly small and, in fact, so small that these modes are not present, or at least not significant. Hence, in the metallic lens, the necessity of limiting the maximum value of the $b$ dimension is obviated and the $b$ dimension may be, and preferably is, made many wavelengths long, for the purpose of securing a desired lens aperture and f-number. Since the axial length or lens thickness $t$ of the metallic lens unit is small, and the $b$ dimension is large, it follows that the attenuation is exceedingly low and negligible. By way of contrast, in ordinary guides having a relatively long axial length, such as a conventional rectangular guide having four metallic walls, or such as a flat guide used in conjunction with the parabolic reflector of a pill-box (cheesebox) feed and having a large $a$ and a small $b$ dimension, a $b$ dimension of about a half wavelength is employed, for the two fold purpose of preventing the establishment of the second and higher modes and, at the same time, of reducing the attenuation to the minimum obtainable without introducing the unwanted modes.

Relative to the above, while the dielectric channels 6 in all the embodiments of the invention described in detail herein are preferably electrically open at the short ends, to wit, the bottom and top ends, they may be electrically closed. More particularly, although the top and bottom horizontal members 11 and the intermediate transverse horizontal supporting struts 11, Figs. 13, 14, 15 and 16, are preferably made of wood, or other insulating material, as illustrated, they may be made of conductive material as, for example, metal. If members 11 are metallic, the lens operations would not be affected, and the reflective effects would not be of consequence, inasmuch as the wave polarization is vertical and therefore perpendicular to these members. Also, in this connection, it may be remarked that the "below-frequency cut-off" dielectric channels, such as the unit channels 6 in the focusing refractors described herein and the unit channels in the wave changers disclosed in my above-mentioned companion application, which channels have a dimension $a$ greater than a half wavelength, are sometimes termed "live" channels. On the other hand, the "above frequency cut-off" dielectric channels, such as those used in the grid reflector referred to herein, and having a dimension $a$ smaller than a half wavelength, are sometimes termed "dead" channels.

As regards the method and system for avoiding excessive feedback of reflected energy to the primary antenna, it should be understood that this feature is applicable to other antenna systems utilizing a passive antenna member through which the waves are conveyed as, for example, the well-known diffractive antenna system comprising a zone plate diffractor. It may also be added that since the lens has two faces its back face may have one of several contours, its front face having a complementary contour to produce the desired focusing action. Hence, when the zone facets are disposed along a circle, as in the system of the above-mentioned application of W. D. Lewis, for securing a wide scanning angle in a radar system, the back faces of the zone facets may have any suitable curvature. On the other hand, in a reflector system comprising zone facets disposed on a circle, the curvature of the reflector is of necessity parabolic.

Although the invention has been explained in connection with certain embodiments, it is not to be limited to the described embodiments inasmuch as other apparatus may be successfully used in practicing the invention.

What is claimed is:

1. A positive lens comprising a parallel pair of flat metallic elements spaced apart a distance dependent upon the wavelength of the energy to be transmitted through the lens, the lengths of said elements being large with respect to said spacing, one pair of corresponding longitudinal edges of said elements being linear and the other pair of corresponding longitudinal edges of said elements being concave.

2. A lens for focussing waves having a given wavelength and a given polarization, said lens comprising a pair of flat metallic elements spaced apart a distance dependent upon said wavelength and extending parallel to said polarization, one pair of corresponding longitudinal edges of said plates being linear and the other pair of corresponding longitudinal edges being elliptically concave.

3. A lens for focusing waves included in a given frequency band and having a given polarization, said lens comprising a dielectric medium and only one pair of conductive plates bounding said medium, said plates being parallel to each other and to said polarization, the spacing between said plates being at least a half wavelength of the longest wave conveyed through the lens, the length of said plates being a plurality of wavelengths at one of the conveyed wavelengths, one pair of corresponding longitudinal edges of said plates being linear and the other pair of corresponding longitudinal edges being curvilinear.

4. An antenna lens for focusing waves having a given polarization and a given propagation direction, comprising a pair of flat conductive members positioned parallel to said polarization and spaced in a plane perpendicular to said polarization, the dimension of each member parallel to said direction corresponding to the thickness of said lens being curvilinearly graded from a minimum at its center coincident with the lens axis to a maximum at the extremities.

5. A radio lens having a plane face and a concave face and comprising a plurality of dielectric channels, each comprising a dielectric medium of rectangular cross-section in a plane perpendicular to the axis of said lens, the length of which cross-section is large in comparison with its width, each said medium being bounded on its longer two sides by flat metallic members, the longitudinal edges of which lie in and define said plane and concave faces.

6. A lens having a plane face and a concave face and comprising a plurality of similar metallic flat members, each of said members being long in comparison with its maximum width, said members being parallel and spaced apart at substantially equal intervals, said intervals being small relative to the length of said members, the opposite longitudinal edges of said members lying in and defining said plane and said concave faces, respectively, said concave face being linear in one plane containing the lens axis and elliptical in an axial plane perpendicular to said first mentioned plane.

7. A lens having a plane face and an ellipsoidally concave face and comprising a plurality of dielectric channels each comprising a dielectric medium of rectangular cross-section in a plane perpendicular to the axis of said lens, the length of which cross-section is large with respect to its width, each said medium being bounded on its longer sides by flat metallic members, the opposite longitudinal edges of said metallic members lying in and defining said plane and said ellipsoidally concave faces, respectively.

8. In a radar scanning antenna system, a lens having a vertex and a focal point, and a primary antenna displaced from the focal point and spaced from said vertex a distance equal to the focal length of said lens.

9. In a radio system for transmitting or receiving waves propagated along a given path, a dielectric guide having a first end constituting an aperture positioned on said path, a translation device connected to the other end of said guide, and a plano-concave lens comprising a plurality of parallel metallic plates, said lens being positioned in front of said aperture and having its vertex on said path, substantially, the axis of said lens being at an acute angle to said path.

10. A stepped multiple-zone positive lens, having concave zone faces or facets aligned with different elliptical curves.

11. A stepped multiple-zone lens for focusing waves having a given wavelength, said lens having an axis and adjacent zone facets aligned with curves intersecting said axis at points spaced apart a distance equal to said wavelength, as measured in free space, divided by unity minus the refractive index of said lens.

12. A stepped multiple-zone lens for focusing waves having a given polarization, said lens comprising a plurality of stepped parallel metallic plates spaced apart along a direction perpendicular to said polarization, the corresponding points on the steps of each plate being linearly aligned.

13. A stepped multiple-zone plano-elliptical lens comprising a pair of parallel stepped metallic plates and a dielectric medium included therebetween, each plate having at least one pair of arcuate notch edges corresponding to adjacent zone facets and a linear notch edge corresponding to a zone step and extending between the uncorrespondent extremities of said arcuate edges, said linear edge and the axis of said lens forming an acute angle smaller than the angle between said axis and a line passing through one of said uncorrespondent extremities and the focus of said lens.

14. A stepped multiple-zone, plano-ellipsoidally concave, circularly-symmetrical, metallic lens having a focal point and a square periphery, said lens comprising a plurality of sixty to seventy dielectric channels each comprising a dielectric medium bounded by metallic plates on two sides extending parallel to the polarization of the propagated wave, the intermediate plates each having a plurality of arcuate notch edges and a plurality of linear notch edges, each linear notch edge extending between the uncorrespondent extremities of adjacent arcuate edges, said lens containing a plurality of zones, the number of zones as measured radially in a direction parallel to one side of said square periphery being five and as measured radially along a diagonal of said square periphery being nine, the different zones having different elliptical curvatures.

15. A metallic lens in accordance with claim 14 and a primary antenna at the focal point of said lens.

16. A horn antenna comprising a horn having in its mouth aperture a stepped multiple-zone, plano-ellipsoidally concave, circularly symmetrical, metallic lens in accordance with claim 14.

17. A plurality of plate elements having conductive surfaces symmetrically placed and substantially equally spaced to form parallel plate wave guides, each plate having two oppositely-disposed longitudinal edges, at least one of said longitudinal edges being curved, the width of each plate between said oppositely-disposed edges varying from point to point along the length of said plate the corresponding longitudinal edges of all said plates being parallel, the corresponding oppositely-disposed longitudinal edges of each consecutive pair of said plates defining opposed orifices of the wave guide formed between them, said wave guide including said orifices being substantially free from conductive material, whereby electromagnetic energy having a given field pattern and polarized parallel to said plate elements and incident on one set of said longitudinal edges is refracted in passing through said wave guides to form a desired field pattern upon emerging from said second edges.

18. An antenna for the transfer of electromagnetic energy including a plurality of substantially planar and parallel conductive plates separated substantially equal distances to form wave guides, each said plate having two oppositely-disposed longitudinal edges, at least one of said edges being curved, the corresponding longitudinal edges of all said plates being substantially parallel, the set of curved longitudinal edges of said plates lying on a cylindrical surface the longitudinal axis of said cylindrical surface being perpendicular to the planes of said plates, the other set of longitudinal edges of said plates lying on a smooth surface the longitudinal axis of said smooth surface also being perpendicular to the planes of said plates, the width of each of said plates between said oppositely-disposed longitudinal edges varying from point to point along the length of said plate, whereby energy having a given field pattern, polarized in the plane of said conductive plates and incident on said cylindrical surface is refracted in passing through said wave guides to form a desired field pattern upon emerging from said smooth surface.

References Cited in the file of this patent

UNITED STATES PATENTS

| Number | Name | Date |
|---|---|---|
| 1,693,021 | Cameron | Nov. 27, 1928 |
| 1,906,546 | Darbord | May 2, 1933 |
| 1,939,345 | Gerth et al. | Dec. 12, 1933 |
| 1,990,649 | Ilberg | Feb. 12, 1935 |
| 2,043,347 | Clavier et al. | June 9, 1936 |
| 2,078,302 | Wolff | Apr. 27, 1937 |
| 2,129,669 | Bowen | Sept. 13, 1938 |
| 2,129,712 | Southworth | Sept. 13, 1938 |
| 2,169,553 | Bruce | Aug. 15, 1939 |
| 2,206,683 | Wolff | July 2, 1940 |
| 2,206,923 | Southworth | July 9, 1940 |
| 2,219,653 | Krugel | Oct. 29, 1940 |
| 2,240,941 | Ohl | May 6, 1941 |
| 2,255,042 | Barrow | Sept. 9, 1941 |
| 2,273,447 | Ohl | Feb. 17, 1942 |
| 2,283,568 | Ohl | May 19, 1942 |
| 2,283,935 | King | May 26, 1942 |
| 2,290,665 | Arnesen | July 21, 1942 |
| 2,298,272 | Barrow | Oct. 13, 1942 |
| 2,310,294 | Katzin | Feb. 9, 1943 |
| 2,369,268 | Trevor | Feb. 13, 1945 |
| 2,369,808 | Southworth | Feb. 20, 1945 |
| 2,398,095 | Katzin | Apr. 9, 1946 |
| 2,415,807 | Barrow et al. | Feb. 18, 1947 |
| 2,427,005 | King | Sept. 9, 1947 |
| 2,442,951 | Iams | June 8, 1948 |
| 2,460,401 | Southworth | Feb. 1, 1949 |

OTHER REFERENCES

Microwave Transmission, Slater, McGraw-Hill, 1942, p. 94 and 95.